US 6,373,166 B1

(12) United States Patent
Asao et al.

(10) Patent No.: US 6,373,166 B1
(45) Date of Patent: Apr. 16, 2002

(54) ALTERNATOR

(75) Inventors: Yoshihito Asao; Katsumi Adachi, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/635,860

(22) Filed: Aug. 11, 2000

(30) Foreign Application Priority Data

Feb. 10, 2000 (JP) ........................................ 2000-033807

(51) Int. Cl.[7] ............................. H02K 1/24; H02K 1/22
(52) U.S. Cl. .................. 310/263; 310/261; 310/45; 310/62; 310/179
(58) Field of Search ............................... 310/263, 261, 310/154, 179, 180, 45, 62

(56) References Cited

U.S. PATENT DOCUMENTS 6,020,669 A * 2/2000 Umeda et al. ............... 310/263
6,091,169 A * 7/2000 Umeda et al. ............... 310/263
6,097,130 A * 8/2000 Umeda et al. ............... 310/263
6,127,763 A * 10/2000 Nakamura et al. .......... 310/263

FOREIGN PATENT DOCUMENTS

DE    19922794    11/1999
JP    11155270    6/1999
JP    11-164499   6/1999   ............ H02K/1/14

* cited by examiner

Primary Examiner—Burton S. Mullins
(74) Attorney, Agent, or Firm—Sughrue Mion, PLLC

(57) ABSTRACT

A ratio (L2/L1) between an axial length L1 of disk portions and a length L2 of a stator core over lapping the disk portions in a radial direction is 0.3 or more, and a ratio (R2/R1) between an outside radius R1 of claw-shaped magnetic poles and an outside radius R2 of a cylindrical portion is within a range of 0.50 to 0.54.

7 Claims, 23 Drawing Sheets

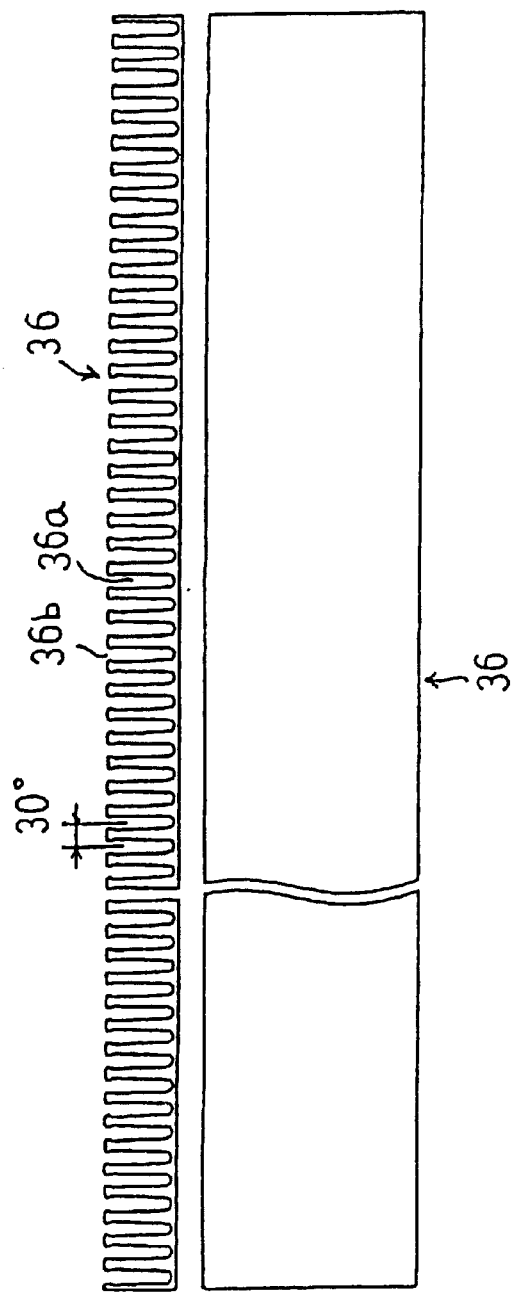

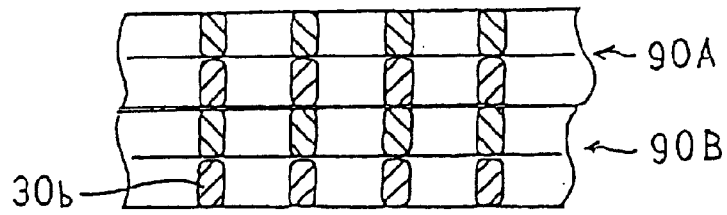
FIG. 13(a)
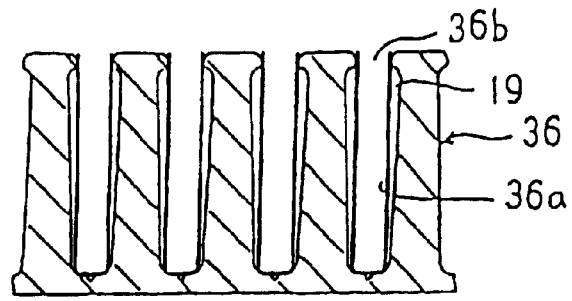
FIG. 13(b)
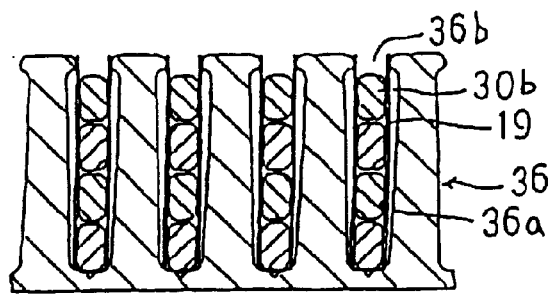
FIG. 13(c)
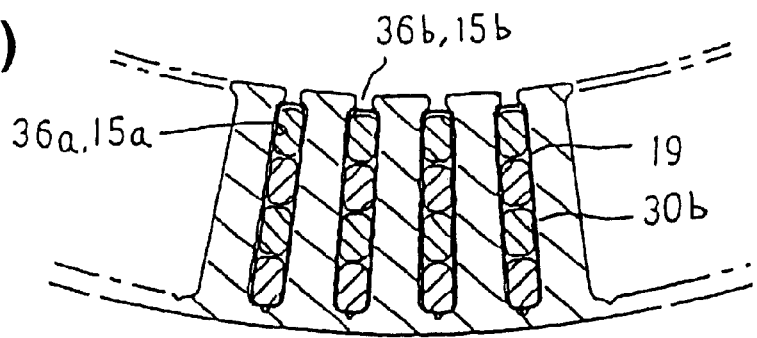

ALTERNATOR

BACKGROUND OF THE INVENTION

1. Field of the Invention

The present invention relates to an alternator driven by an internal combustion engine, for example, and relates to an automotive alternator mounted to an automotive vehicle such as a passenger car or a truck, for example.

2. Description of the Related Art

FIG. 20 is a cross section of a conventional automotive alternator, and FIG. 21 is a perspective of a stator in FIG. 20.

This alternator includes: a case 3 composed of an aluminum front bracket 1 and an aluminum rear bracket 2; a shaft 6 disposed within the case 3 having a pulley 4 secured to a first end thereof; a Lundell-type rotor 107 secured to the shaft 6; fans 105a and 105b secured to both axial end surfaces of the rotor 107; a stator 108 secured to an inner wall within the case 3; slip rings 9 secured to a second end of the shaft 6 for supplying electric current to the rotor 107; a pair of brushes 10 sliding on surfaces of the slip rings 9; brush holders 11 accommodating the brushes 10; rectifiers 12 electrically connected to the stator 108 for converting alternating current generated in the stator 108 into direct current; and a regulator 18 fitted over the brush holder 11 for adjusting the magnitude of the alternating voltage generated in the stator 108.

The rotor 107 includes a rotor coil 13 for generating magnetic flux on passage of electric current, and a pole core 14 disposed so as to cover the rotor coil 13, magnetic poles being produced in the pole core 14 by the magnetic flux. The pole core 14 includes a first pole core portion 121 and a second pole core portion 122 which intermesh with each other. The first pole core portion 121 and the second pole core portion 122 are made of iron and include disk portions 201 and 202 which are perpendicular to an axial direction, tapered claw-shaped magnetic poles 123 and 124 extending axially from the disk portions 201 and 202 in opposite directions to each other, and a cylindrical portion 200 connecting the disk portions 201 and 202 to each other, the circumference of the cylindrical portion 200 being covered by the rotor coil 13.

FIG. 22 is a perspective of the stator 108 in FIG. 20, FIG. 23 is a perspective of a stator core 115 in FIG. 22, and FIG. 24 is a partial plan of the stator core 115.

The stator 108 includes a stator core 115 for passage of a rotating magnetic field from the rotor coil 13, the stator core being formed by laminating a number of steel plates, and a stator winding 116 through which an output current flows. The stator core 115 includes an annular core back 82, a number of teeth 81 extending radially inwards from the core back 82 at an even pitch in a circumferential direction. The stator winding 116 is housed in a total of thirty-six slots 83 formed between adjacent teeth 81. The teeth include end portions 85 projecting in a circumferential direction of the stator 108, and post portions 86 connecting the end portions 85 to the core back 82. Spaces called opening portions 84 are formed between the end portions 85 of adjacent teeth 81.

In the automotive alternator of the above construction, electric current is supplied from a battery (not shown) through the brushes 10 and the slip rings 9 to the rotor coil 13, generating magnetic flux and giving rise to a magnetic field. At the same time, since the pulley 4 is driven by the engine and the rotor 107 is rotated by the shaft 6, a rotating magnetic field is applied to the stator core 115, generating electromotive force in the stator winding 116 and an output current is generated by an external load connected to the automotive alternator.

Now, the flux A generated by the rotor coil 13 leaves the first pole core portion 121, which is magnetized with north-seeking (N) poles, crosses an air gap between the rotor 107 and the stator 108, and enters the teeth 81 of the stator core 115. This magnetic flux A then passes through the core back 82, and flows from adjacent teeth across the air gap to the second pole core portion 122, which is magnetized with south-seeking (S) poles.

The amount of flux, which determines the output of the alternator, is itself determined by the magnetomotive force of the rotating magnetic field from the rotor 107 and magnetic resistance of the above magnetic circuit followed by the magnetic flux A. Consequently, if the magnetomotive force is constant, then it is important to shape this magnetic circuit to have the least resistance.

Furthermore, in order to improve the magnetomotive force, it is necessary to increase AT (the field current I multiplied by the number of turns n of conductor in the rotor coil 13), but AT is determined by installation space for the rotor coil 13 inside the pole core 114. When the overall size of the rotor 107 is limited, it becomes necessary to reduce the cross-sectional area of the magnetic path through the pole core 114 in exchange for increases in installation space for the rotor coil 13, and as a result the above-mentioned magnetic resistance increases, reducing the amount of magnetic flux passing through the pole core 114, and the magnetomotive force does not increase.

If one attempts to increase the magnetomotive force by increasing the field current I while keeping the cross-sectional area s of the conductor and the number of turns n constant, the temperature of the rotor coil 13 increases due to copper loss in the rotor coil 13, and the resistance of the conductor in the rotor coil 13 rises due to the increase in temperature, reducing the field current I, and the magnetomotive force does not increase after all.

On the other hand, as shown in FIG. 25, Japanese Patent Laid-Open No. HEI 11-164499 discloses an alternator aimed at increasing magnetomotive force by setting a ratio L1/L2 between an axial length L1 of the stator core 115 and an axial length L2 of the cylindrical portion 200 within a range of 1.25 to 1.75, placing the disk portions 201 and 202 opposite the stator core 115 so that the magnetic flux A flows directly from the disk portions 201 and 202 to the stator core 115, thereby increasing the cross-sectional area of the magnetic path through the pole core 114, and setting a ratio between an outside radius R1 of the claw-shaped magnetic poles 123 and 124 and an outside radius R2 of the cylindrical portion 200 between 0.54 and 0.60, thereby increasing the cross-sectional area of the magnetic path through the cylindrical portion 200.

However, in the case of this alternator, the figures are set with the aim of improving the output of the alternator per unit weight, and one problem has been that output decreases at low-speed rotation due to magnetic saturation.

Furthermore, by increasing the area of the disk portions 201 and 202 facing the stator core 115, thereby increasing the amount of overlap, the cross-sectional area of passages through valley portions 410 between the claw-shaped magnetic poles 123 and 124, which are passages for cooling ventilation, is reduced, increasing resistance to ventilation flow inside the rotor 107, and another problem has been that when a large field current I flows through the rotor coil 13, the cooling of the rotor coil 13 has been insufficient, increasing the resistance of the conductors in the rotor coil 13 and reducing the field current I, thereby preventing output from being increased.

SUMMARY OF THE INVENTION

The present invention aims to solve the above problems and an object of the present invention is to provide an alternator enabling the magnetic flux to be increased by increasing the cross-sectional area of the magnetic path, and also enabling output to be improved by reducing copper loss in the rotor coil.

To this end, according to the present invention, there is provided an alternator being such that a ratio (L2/L1) between an axial length L1 of disk portions and a length L2 of a stator core overlapping the disk portions in a radial direction is 0.3 or more, and a ratio (R2/R1) between an outside radius R1 of claw-shaped magnetic poles and an outside radius R2 of a cylindrical portion is within a range of 0.50 to 0.54.

BRIEF DESCRIPTION OF THE DRAWINGS

FIGS. 12(a) and 12(b) are a side elevation and a rear plan, respectively, explaining the construction of a stator core of the automotive alternator in FIG. 1;

FIGS. 13(a) to 13(c) are cross sections explaining the manufacturing process for the stator of the automotive alternator in FIG. 1;

DETAILED DESCRIPTION OF THE PREFERRED EMBODIMENTS

Embodiment 1

Figure 1:
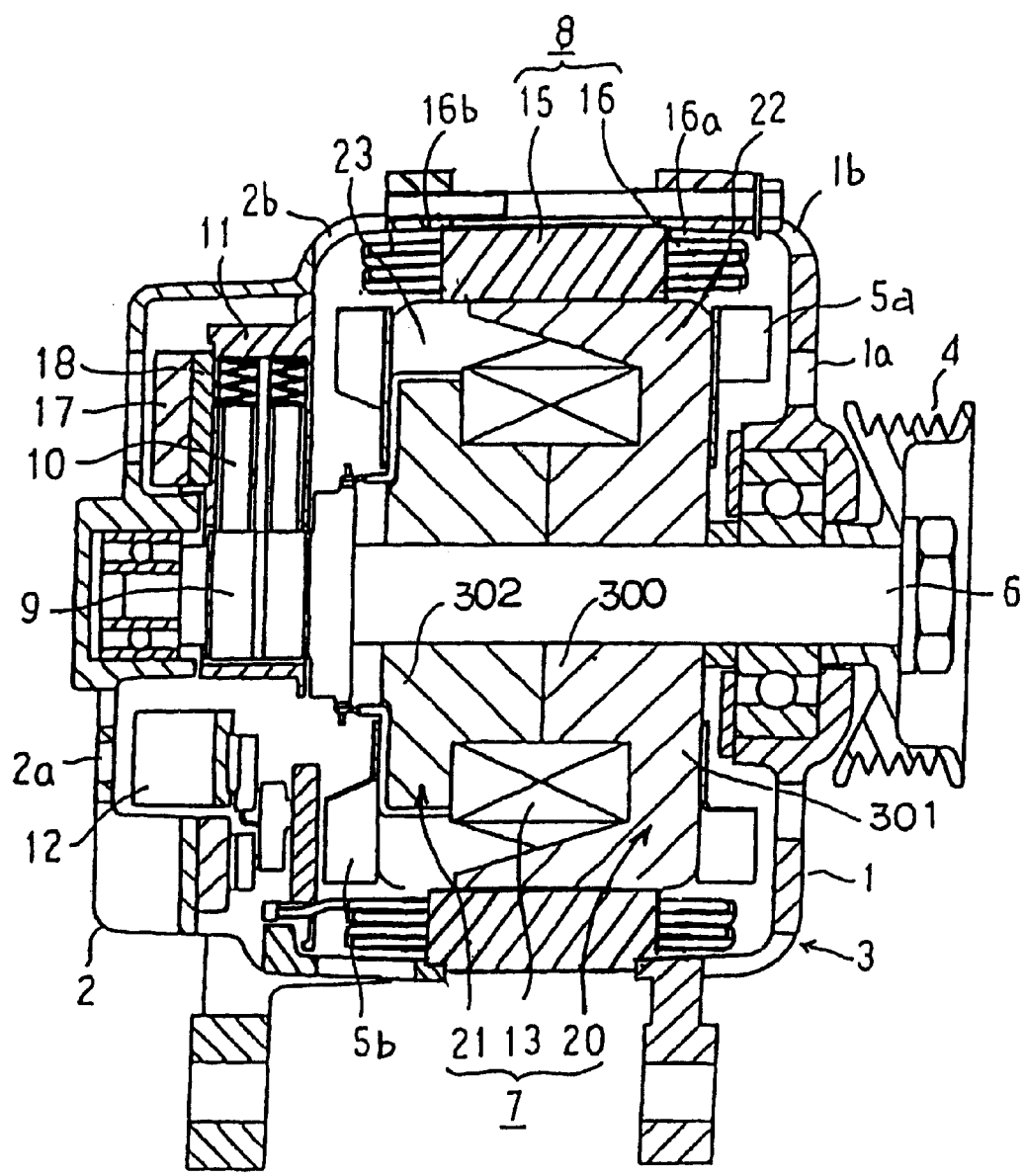
FIG. 1 is a cross section of an automotive alternator according to Embodiment of the present invention.
Figure 2:
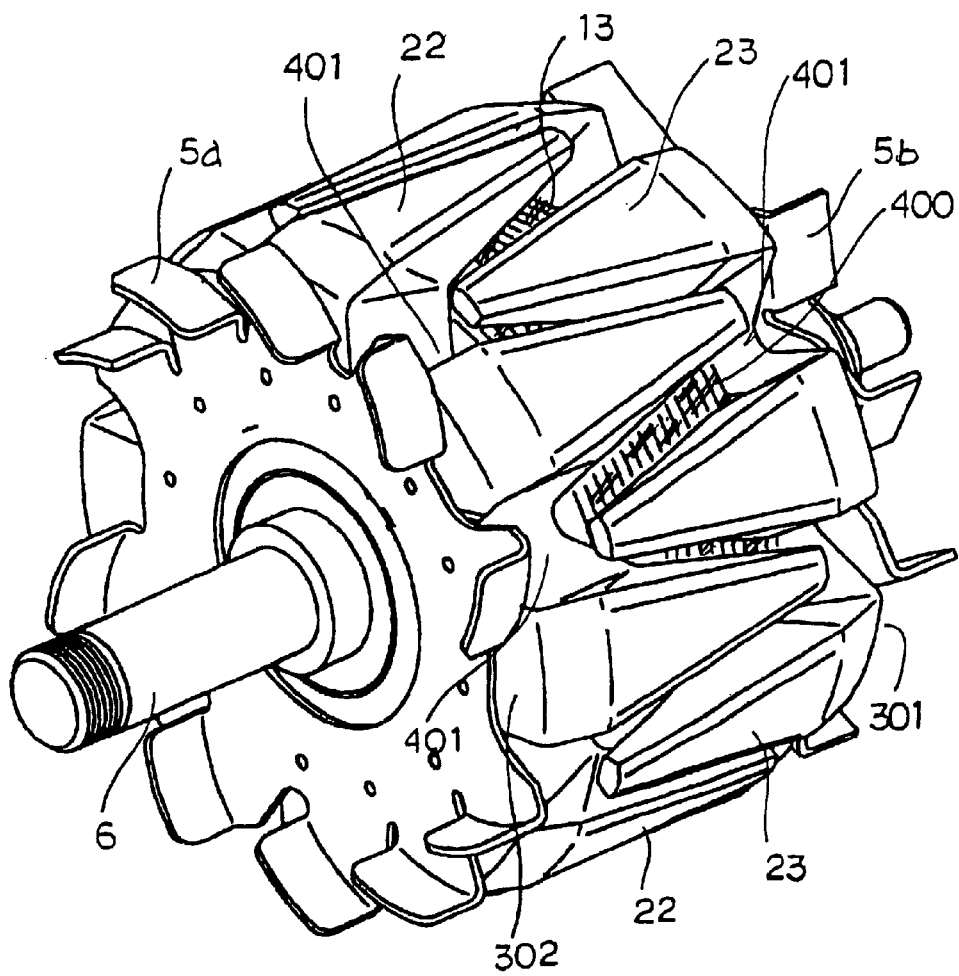
FIG. 2 is a perspective of a rotor in FIG. 1.
Figure 3:
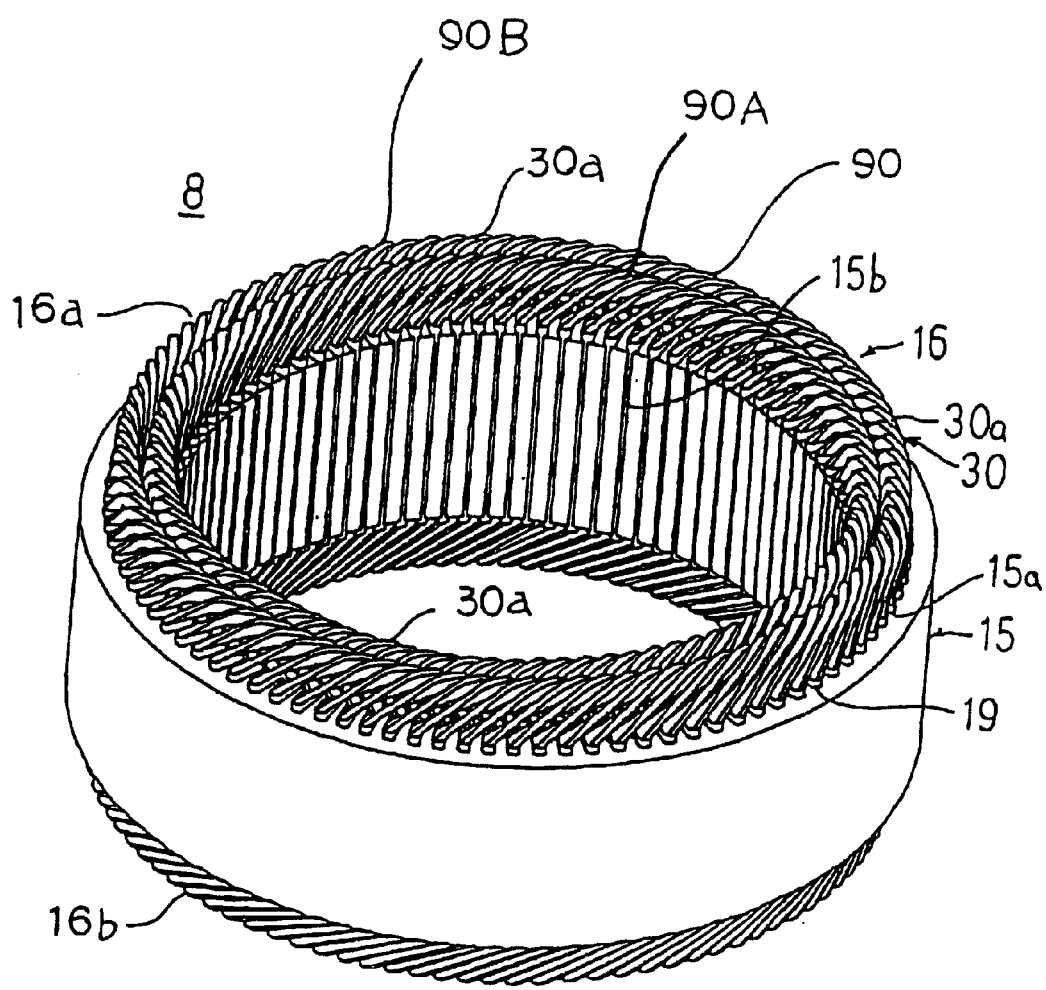
FIG. 3 is a perspective of a stator in FIG. 1.
Figure 4:
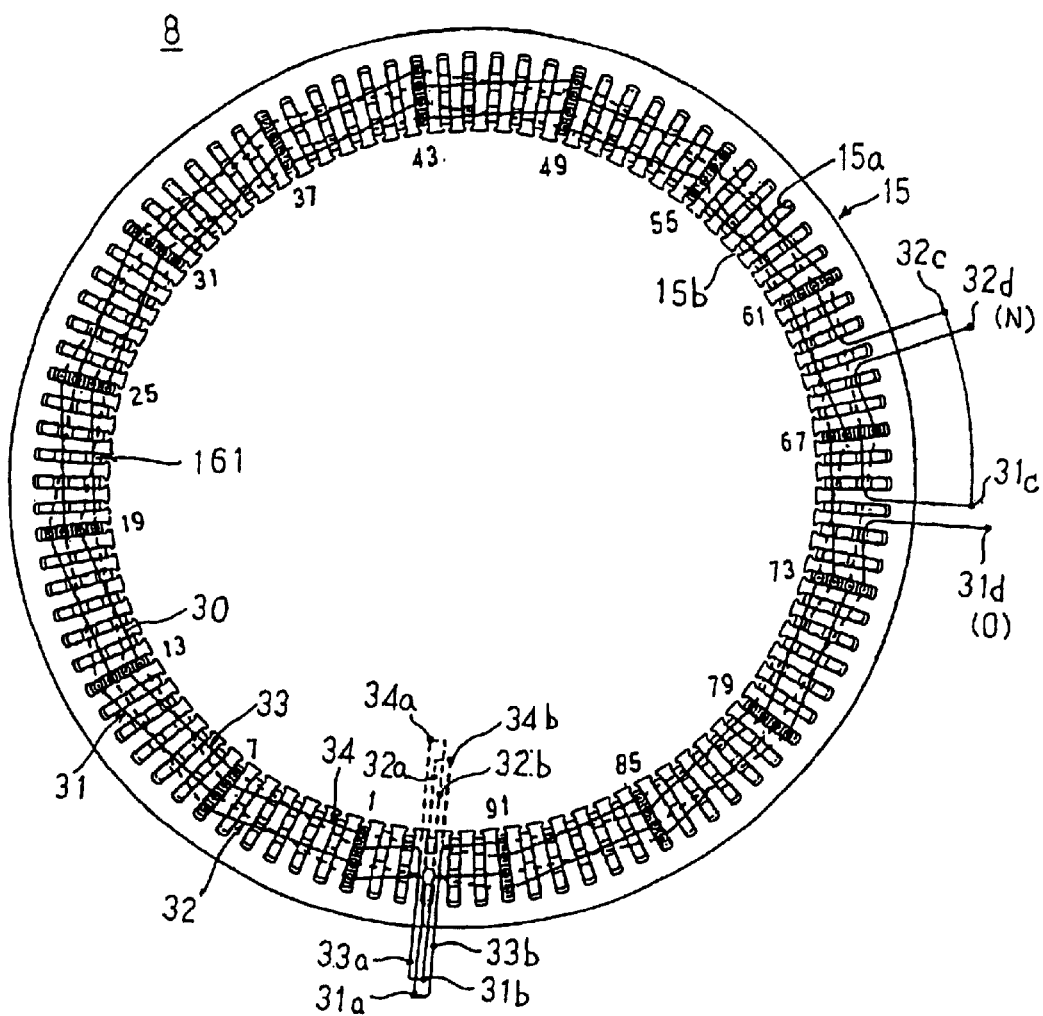
FIG. 4 is winding diagram for the stator in FIG. 1.
Figure 5:
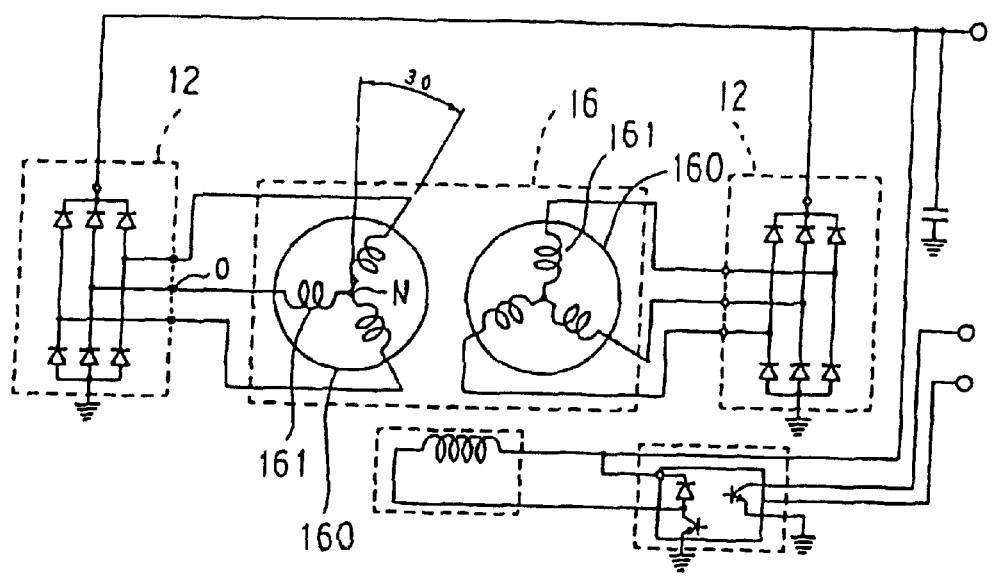
FIG. 5 is a circuit diagram for the automotive alternator in FIG. 1.

FIG. 1 is a cross section of an automotive alternator according to Embodiment 1 of the present invention, FIG. 2 is a perspective of a rotor of the automotive alternator in FIG. 1, FIG. 3 is a perspective of a stator in FIG. 1, FIG. 4 is winding diagram for the stator in FIG. 1, and FIG. 5 is an electrical circuit diagram for the alternator in FIG. 1. Moreover, the output wires and neutral-point lead wires of each phase have been omitted from FIG. 3.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; a first fan 5a and a second fan 5b secured to both axial end surfaces of the rotor 7; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; rectifiers 12 electrically connected to the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8. An axial length of the stator 8 is shorter than an axial length of the rotor 7. Radial dimensions of the second fan 5b at a rear end are larger than radial dimensions of the first fan 5a at a front end.

The rotor 7 includes a rotor coil 13 for generating magnetic flux on passage of electric current, and a pole core disposed so as to cover the rotor coil 13, magnetic poles being produced in the pole core by the magnetic flux. The pole core includes a pair of pole core portions 20 and 21. The pole core, which is made of iron and secured to the shaft 6, includes a cylindrical portion 300 onto which the rotor coil 13 is wound, disk portions 301 and 302 extending radially from both axial end portions of the cylindrical portion 300, and sixteen claw-shaped magnetic poles 22 and 23 extending axially eight-apiece from the disk portions 301 and 302. The claw-shaped magnetic poles 22 and 23 cover the rotor coil 13, facing each other at even pitch circumferentially so as to intermesh. Furthermore, a resin 400, which is a varnish having high thermal conductivity, is applied to an outer circumferential surface of the rotor coil 13 and between the rotor coil 13 and the disk portions 301 and 302.

The stator 8 includes: a cylindrical stator core 15 composed of a laminated core formed with a number of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator winding 16, which includes two sets of winding assemblies 90A and 90B, includes a number of winding sub-portions in each of which one conductor 30 is bent back outside the slots 15a at end surfaces of the stator core 15 and wound into a wave winding so as to alternately occupy an inner layer and an outer layer in a slot depth direction within slots 15a a predetermined number of slots apart.

The stator winding 16 has a front-end coil end 16a and a rear-end coil end 16b which protrude from their respective axial end surfaces of the stator core 15. The coil ends 16a and 16b are composed of a number of extended portions 30a which are heat dissipating portions. The extended portions 30a, which all have an identical shape, are separated circumferentially and radially, and arranged neatly in two rows.

Moreover, in this case, the stator core 15 is formed with ninety-six slots 15a at even pitch so as to house the two sets of stator windings 16 such that the number of slots housing each phase of the alternating-current windings corresponds to the number of magnetic poles (sixteen) in the rotor 7. Furthermore, long, insulated copper wire material having a rectangular cross section, for example, is used for the conductors 30.

Next, the winding construction of one phase of stator winding group 161 will be explained in detail with reference to FIG. 4.

One phase of stator winding group 161 is composed of first to fourth winding sub-portions 31 to 34 each formed from one conductor 30. The first winding sub-portion 31 is formed by wave winding one conductor 30 into every sixth slot from slot numbers 1 to 91 so as to alternately occupy a first position from an outer circumferential side and a second position from the outer circumferential side inside the slots 15a. The second winding sub-portion 32 is formed by wave winding a conductor 30 into every sixth slot from slot numbers 1 to 91 so as to alternately occupy the second position from the outer circumferential side and the first position from the outer circumferential side inside the slots 15a. The third winding sub-portion 33 is formed by wave winding a conductor 30 into every sixth slot from slot numbers 1 to 91 so as to alternately occupy a third position from the outer circumferential side and a fourth position from the outer circumferential side inside the slots 15a. The fourth winding sub-portion 34 is formed by wave winding a conductor 30 into every sixth slot from slot numbers 1 to 91 so as to alternately occupy the fourth position from the outer circumferential side and the third position from the outer circumferential side inside the slots 15a. The conductors 30 are arranged to line up in a row of four conductors within each slot 15a with the longitudinal direction of their rectangular cross sections aligned in a radial direction.

Then, at a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form a winding portion having two turns.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form a winding portion having two turns.

In addition, a portion of the conductor 30 of the second winding sub-portion 32 extending outwards at the first end of the stator core 15 from slot numbers 61 and 67 is cut, and a portion of the conductor 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, and a second cut end 31d of the first winding sub-portion 31 and a second cut end 32d of the second winding sub-portion 32 become an output wire (O) and a neutral-point lead wire (N), respectively.

A total of six phases of stator winding groups 161 are similarly formed by offsetting the slots 15a into which the conductors 30 are wound one slot at a time. Then, as shown in FIG. 5, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Next, the assembly of the stator 8 will be explained with reference to FIGS. 6 to 15.

Figure 6:
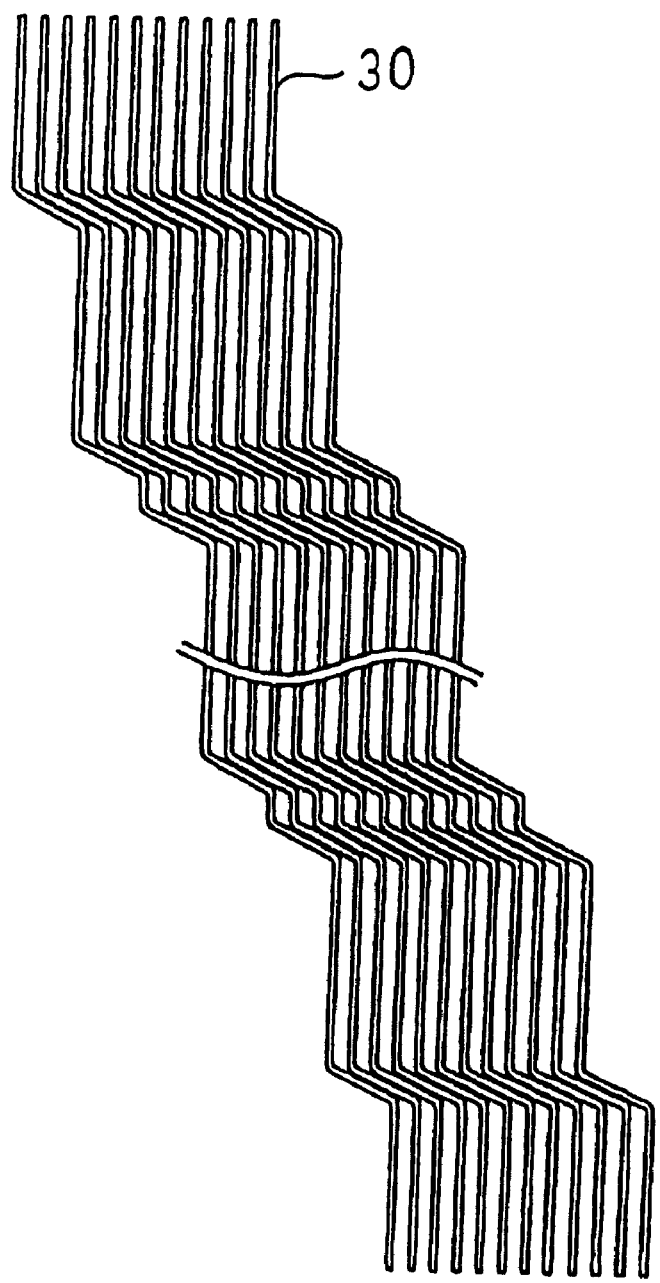
FIG. 6 is a diagram showing a stator winding of the automotive alternator in FIG. 1 during manufacture.
Figure 7:
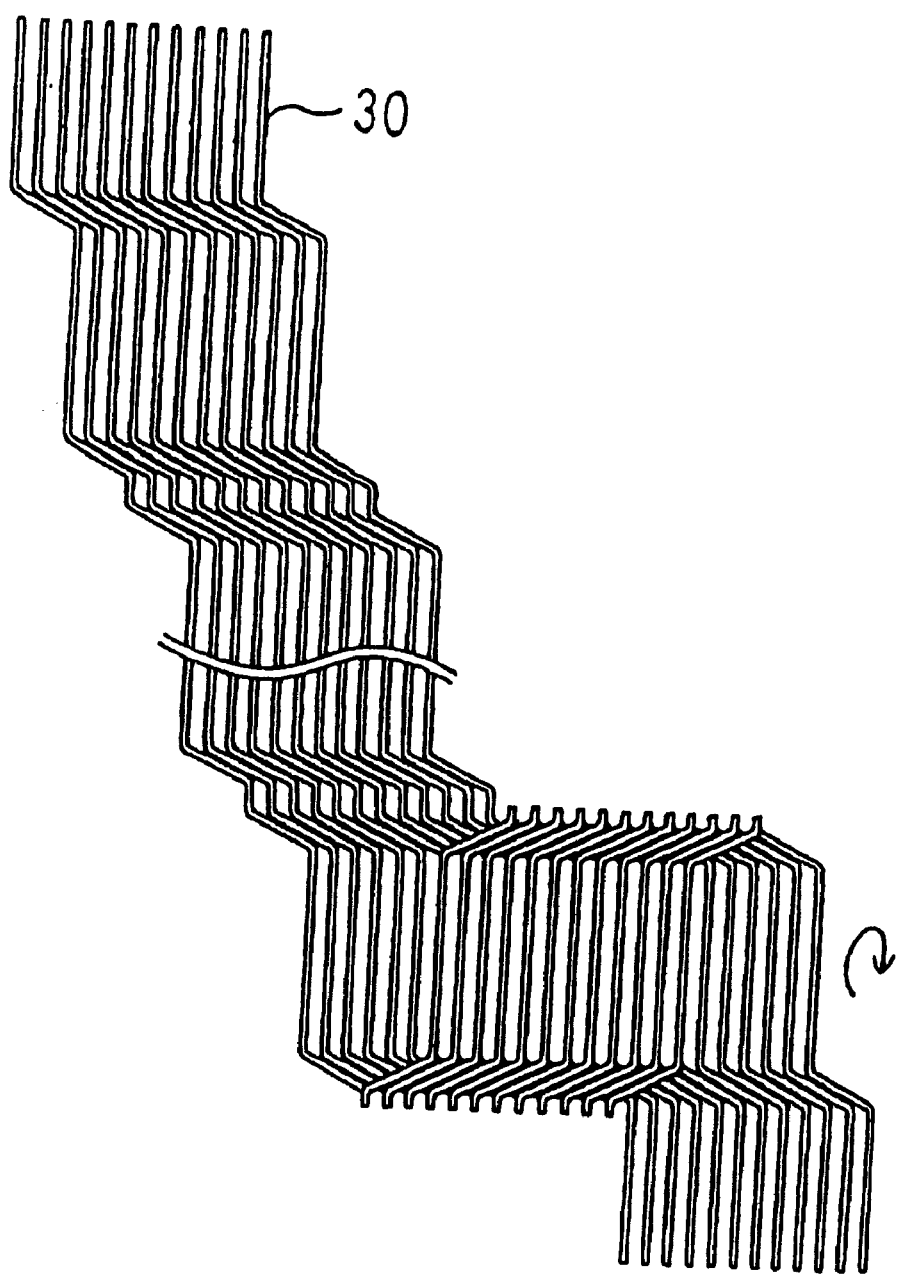
FIG. 7 is a diagram showing a stator winding of the automotive alternator in FIG. 1 during manufacture.
Figure 8A:
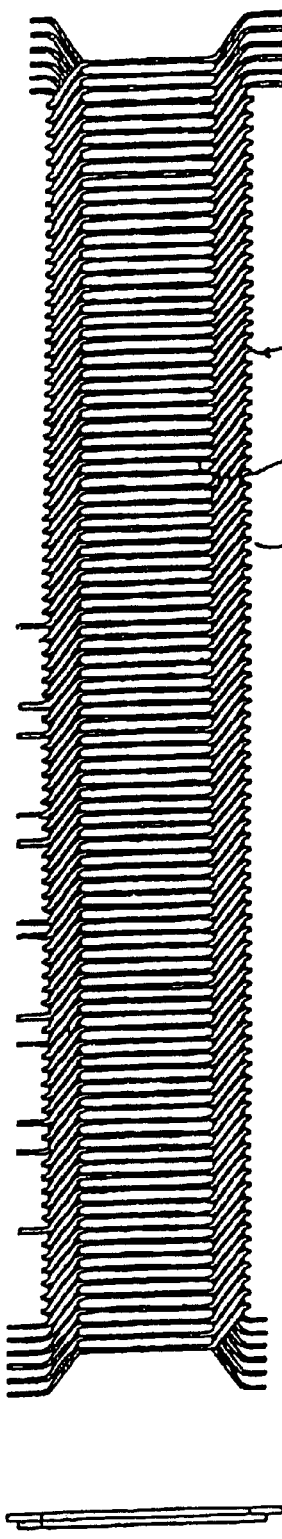
FIGS. 8(a) and 8(b) are an end elevation and a plan, respectively, showing a winding assembly constituting part of a stator winding of the automotive alternator in FIG. 1.
Figure 8B:
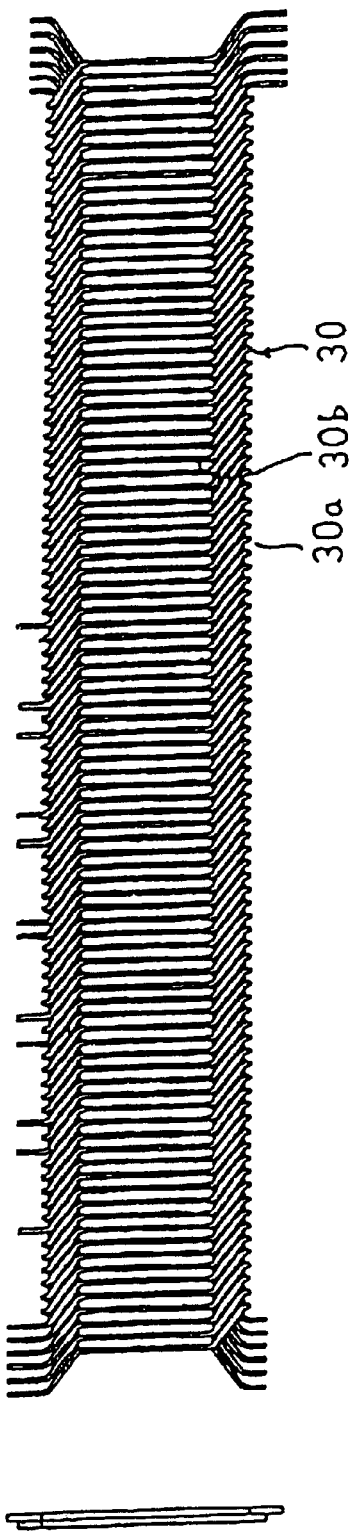
Figures 9A, 9B:
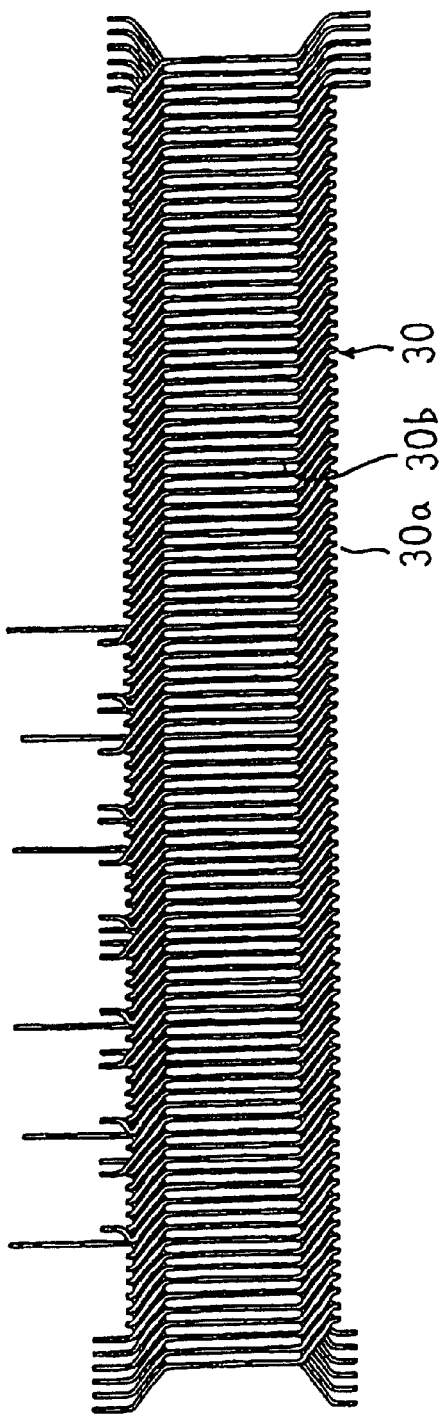
FIGS. 9(a) and 9(b) are an end elevation and a plan, respectively, showing a winding assembly constituting part of a stator winding of the automotive alternator in FIG. 1.

First, as shown in FIG. 6, twelve conductors 30 are simultaneously bent in the same plane to form a lightning-bolt shape. Then, the winding assembly 90A shown in FIG. 8 is prepared by progressively folding the conductors at right angles, as indicated by the arrow in FIG. 7, using a jig. In addition, the winding assembly 90B which has bridging connections and output wires as shown in FIG. 9 is prepared in the same manner.

Figure 10:
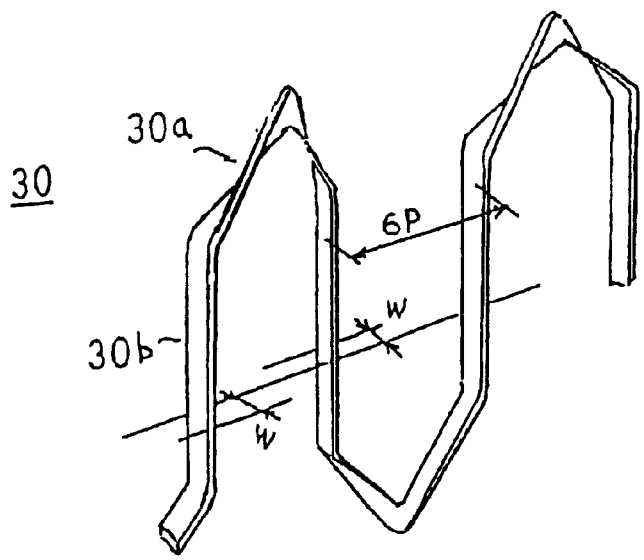
FIG. 10 is a perspective showing part of a conductor constituting part of a stator winding of the automotive alternator in FIG. 1.
Figure 11:
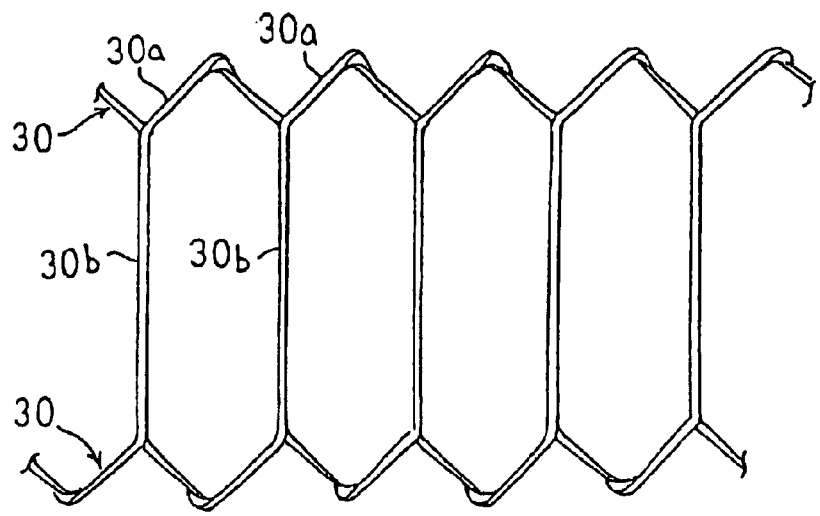
FIG. 11 is a diagram explaining arrangement of the conductors constituting part of a stator winding of the automotive alternator in FIG. 1.

Moreover, as shown in FIG. 10, each conductor 30 is formed by bending it into a planar pattern in which straight portions 30b connected by extending portions 30a are lined up at a pitch of six slots (6P). Adjacent straight portions 30b are offset by a distance equal to one width (W) of the conductors 30 by means of the extending portions 30a. The winding assemblies 90A and 90B are constructed by arranging six conductor pairs so as to be offset by a pitch of one slot from each other, each conductor pair consisting of two conductors 30 formed in the above pattern which are offset by a pitch of six slots and arranged such that straight portions 30b overlap as shown in FIG. 11. Six end portions of the conductors 30 each extend outwards from first and second sides at first and second ends of the winding assemblies 90A and 90B. Furthermore, the extending portions 30a are arranged so as to line up in rows on first and second side portions of the winding assemblies 90A and 90B.

Next, the winding assemblies 90A and 90B are annealed for ten minutes at 300° C. so that the belt-shaped winding assemblies 90A and 90B can be easily formed into an annular shape.

Meanwhile, the parallelepiped laminated body 36 is prepared as shown in FIGS. 12(a) and 12(b) by laminating a predetermined number of sheets of SPCC material formed with trapezoidal slots 36a at a predetermined pitch (an electrical angle of 30°) and laser welding an outer portion thereof.

Figure 14:
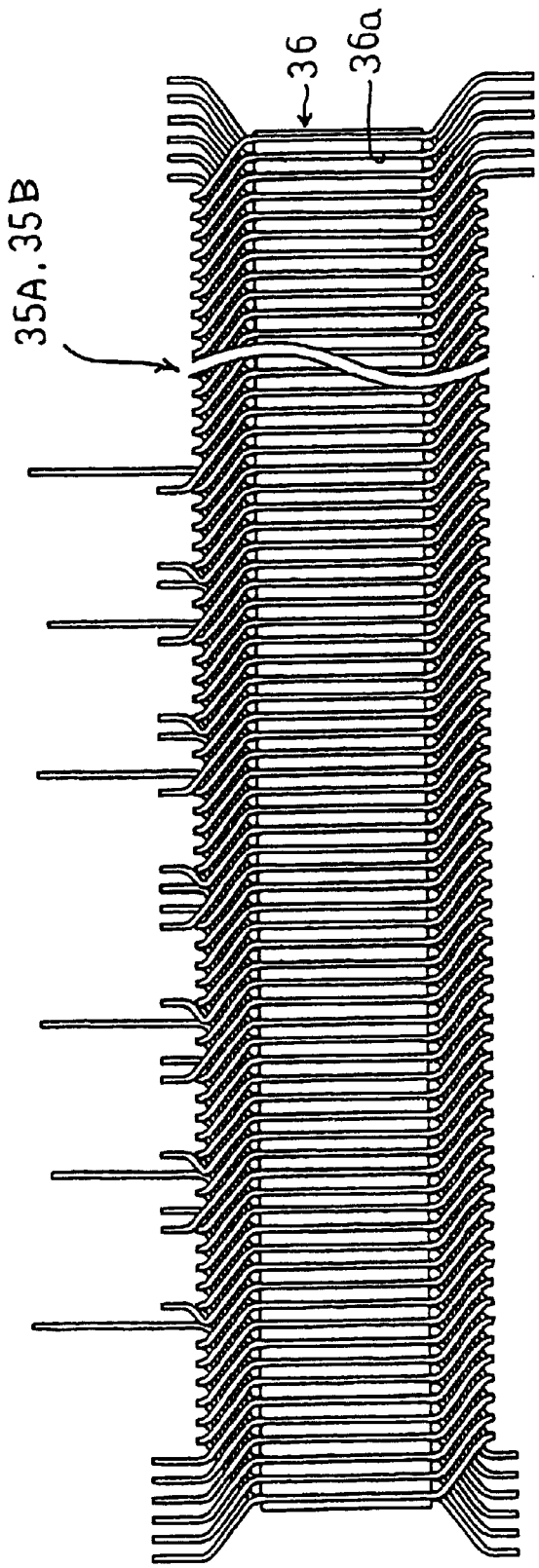
FIG. 14 is a plan showing stator windings of the automotive alternator in FIG. 1 mounted into a laminated body.
Figure 15:
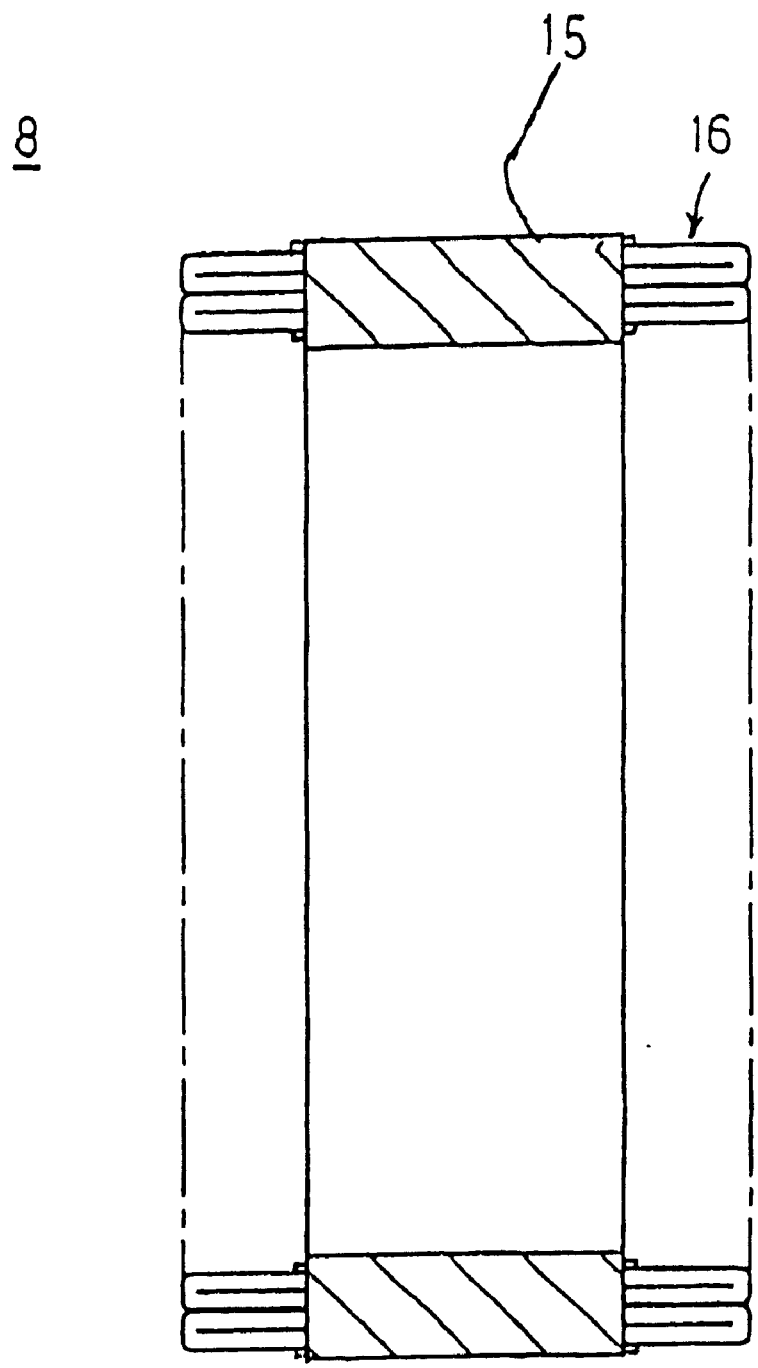
FIG. 15 is a cross section of the stator of the automotive alternator in FIG. 1.

As shown in FIG. 13(a), the insulators 19 are mounted in the slots 36a of the parallelepiped laminated body 36, and the straight portions of the two winding assemblies 90A and 90B are inserted so as to stack up within each of the slots. In this manner, the two winding assemblies 90A and 90B are installed in the parallelepiped laminated body 36 as shown in FIG. 13(b). At this time, straight portions 30b of the conductors 30 are housed in lines of four in a radial direction within the slots 36a and are electrically insulated from the parallelepiped laminated body 36 by the insulators 19. Furthermore, as shown in FIG. 14, the two winding assemblies 90A and 90B are installed in the laminated body 36 so as to stack up one on top of the other.

Next, the laminated body 36 is rolled up and its end surfaces abutted and welded to each other to obtain a stator core 15. At this time, as shown in FIG. 13(c), the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the conductors 30 are connected to each other based on the connections shown in FIG. 4 to form the stator winding group 16 and obtain the stator 8 shown in FIG. 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the second fan 5b, flowing along the axis of the shaft 6, cooling the rectifiers 12 and the regulator 18, and is then deflected centrifugally by the second fan 5b, cooling the rear-end coil end 16b of the polyphase stator winding 16 before being expelled to the outside through the air discharge vents 2b.

At the same time, at the front end, external air is drawn in axially through the air intake vents 1a by rotation of the first fan 5a, and is then deflected centrifugally by the first fan 5a, cooling the front-end coil end 16a of the polyphase stator winding 16 before being expelled to the outside through the air discharge vents 1b.

Because the second fan 5b, whose radial dimensions are larger than the first fan 5a secured to the disk portion 301, is mounted to the disk portion 302 of the rotor 7, pressure within the case 3 is lower at the rear end of the rotor 7 than at the front end. For that reason, cooling ventilation flows from the front end to the rear end through a space between the rotor 7 and the stator 8, cooling the rotor 7 and the stator 8 more efficiently.

Moreover, in this embodiment, because the rectifiers 12, the brush holder 11, the regulator 18, etc, are disposed at the rear end between the air intake vents 2a and the air discharge vents 1b and wind resistance is greater than at the front end, even if a first fan and a second fan having the same radial dimensions were mounted to the two disk portions 301 and 302 of the rotor 7, pressure within the case 3 would still be lower at the rear end of the rotor 7 than at the front end, and cooling ventilation would flow from the front end to the rear end through the space between the rotor 7 and the stator 8, cooling the rotor 7.

Because the resin 400, which is a varnish having high thermal conductivity, is applied to an outer circumferential surface of the rotor coil 13 and between the rotor coil 13 and the disk portions 301 and 302, cooling of the rotor coil 13 is improved by the thermal conductivity of the resin 400, suppressing decreases in the field current due to copper loss.

Figure 16:
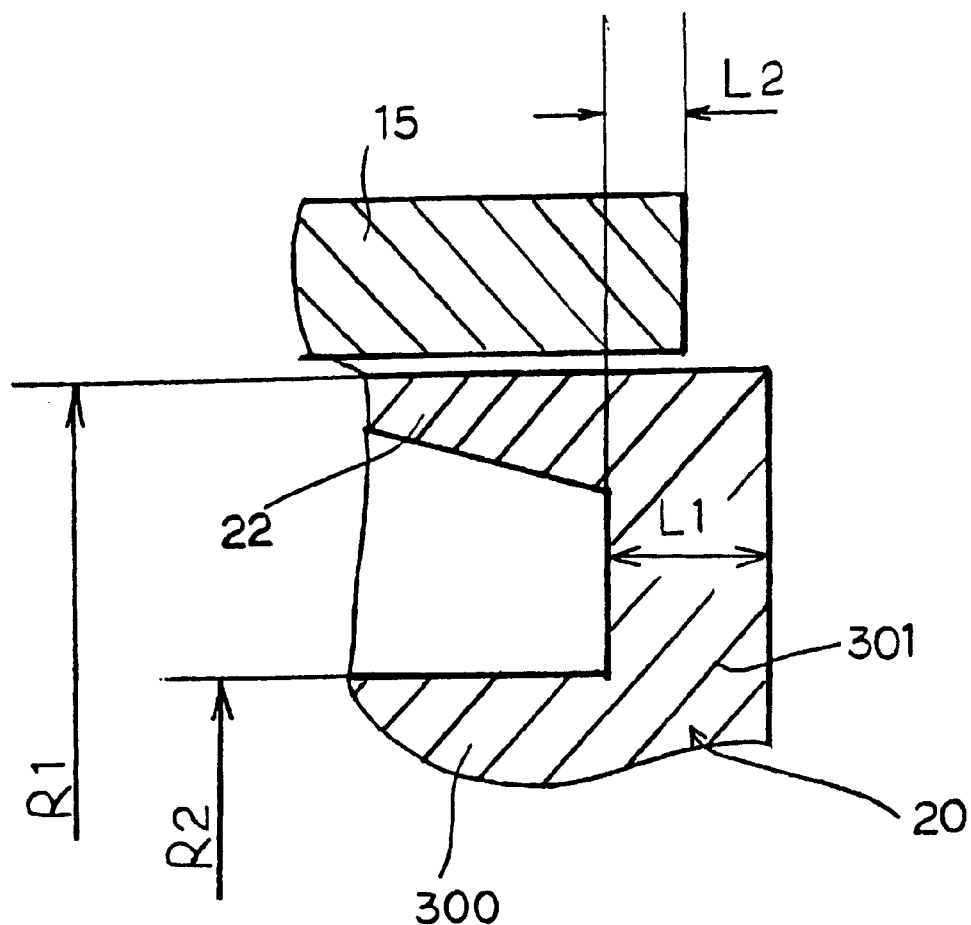
FIG. 16 is a diagram explaining the positional relationship between the stator core and a pole core in FIG. 1.

Now, as shown in FIG. 16, the automotive alternator of the above construction is constructed such that the lap ratio (L2/L1) between the axial length L1 of the disk portions 301 and 302 and the axial length L2 of the stator core 15 radially overlapping the disk portions 301 and 302 is 0.3 or greater. For that reason, in addition to the magnetic flux which flows from the claw-shaped magnetic poles 22 and 23, magnetic flux also flows directly from the disk portions 301 and 302 to the stator core 15, increasing the cross-sectional area of the magnetic path and thereby increasing the amount of magnetic flux crossing the stator winding 16.

Figure 17:
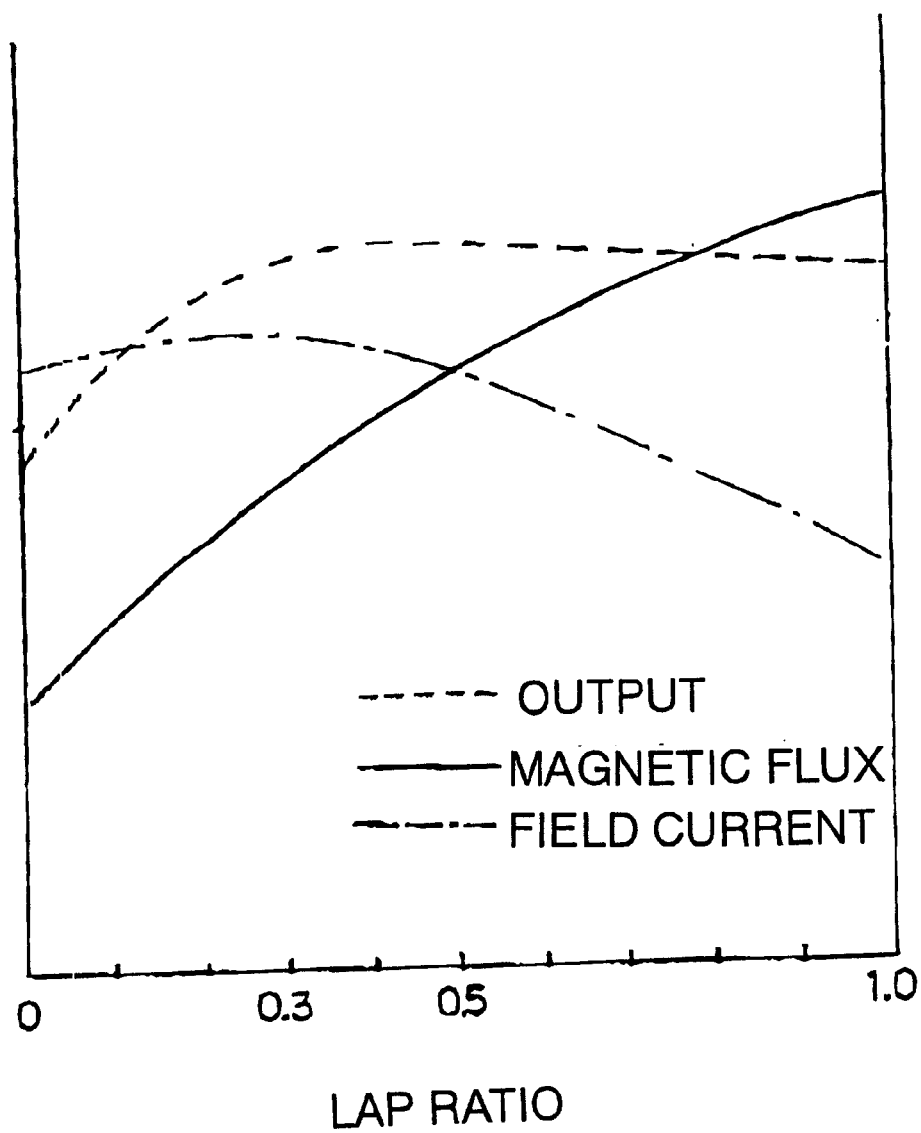
FIG. 17 is a graph of the relationship between the lap ratio and magnetic flux, field current flowing through a rotor coil, and output, at 2000 rpm.

FIG. 17 is a graph of experimental results obtained by the present inventors showing the relationship between the lap ratio and magnetic flux, field current I flowing through a rotor coil, and output, at 2000 rpm, which is low-speed rotation having important characteristics. From this graph, it can also be seen that as the lap ratio increases, the cross-sectional area of the magnetic path increases, magnetic resistance decreases, and the amount of magnetic flux $\phi$ increases. Furthermore, it can be seen that the field current I begins to decrease from a peak at a certain value because the cross-sectional area of passages through valley portions 401 between the claw-shaped magnetic poles 22 and 23, which are passages for cooling ventilation for the rotor 7, is reduced as the lap ratio is increased, reducing the amount of cooling air flowing inside the rotor 7, and the temperature of the rotor coil 13 therefore rises due to copper loss in the rotor coil 13 and resistance is increased. Consequently, since the increase in output resulting from the increase in magnetic flux is eventually cancelled by the reduction in magnetomotive force due to the reduced field current, the output becomes saturated at a peak when the lap ratio (L2/L1) is increased to 0.3.

Figure 18:
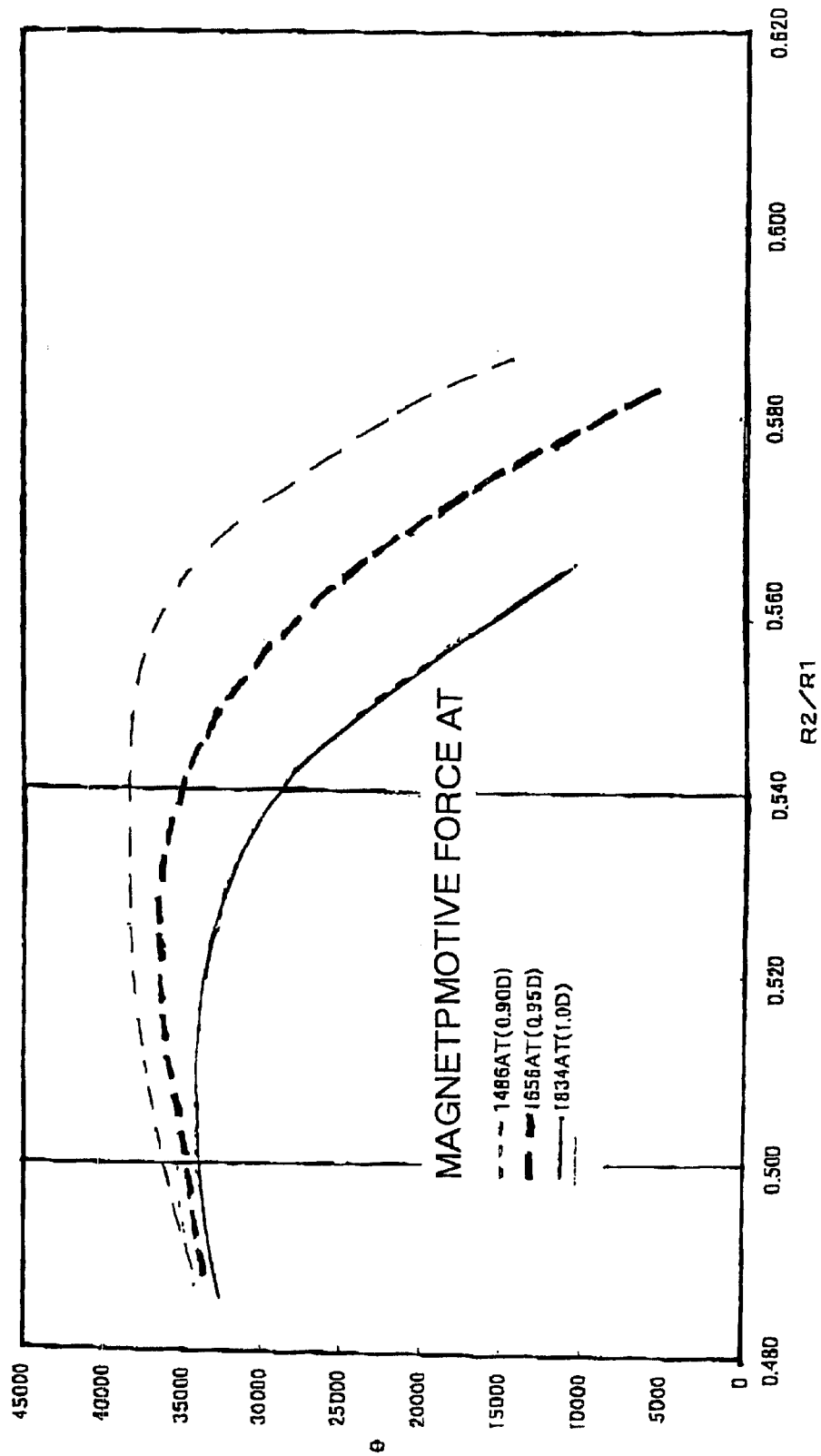
FIG. 18 is a graph of the relationship between a ratio (R2/R1) between an outside radius R1 of claw-shaped magnetic poles and an outside radius R2 of a cylindrical portion and magnetic flux $\phi$.

FIG. 18 is a graph of experimental results obtained by the present inventors showing the relationship between a ratio (R2/R1) between an outside radius R1 of the claw-shaped magnetic poles 22 and 23 and an outside radius R2 of a cylindrical portion, magnetic flux $\phi$, and magnetomotive force AT, when the lap ratio is 0.3 for example. The relationships are shown for three types of magnetomotive force AT as the parameters, namely, when the diameter D of the conductors in the rotor coil 13 is 0.9 mm, 0.95 mm, and 1.00 mm within the range of 1200 to 2000 AT, which is the range of magnetomotive force normally used. It can be seen from the graph that stable high output is achieved when the ratio (R2/R1) is in the range of 0.50 to 0.54.

Because the coil ends 16a and 16b are constructed such that the extended portions 30a, which all have the same shape, are separated circumferentially and radially from each other, and arranged neatly in two rows, the flow of cooling ventilation inside the rotor 7 is not hindered. The coil ends 16a and 16b are uniformly cooled around the entire circumference and wind resistance is low, improving the cooling of the coil ends 16a and 16b and also reducing wind noise. Furthermore, irregularities in the end surfaces of the coil ends 16a and 16b are reduced, increasing space efficiency.

Moreover, because this automotive alternator has three phases, sixteen poles, and the number of slots in the 15a in the stator core 15 is ninety-six, making the number of slots in the stator core 15 two per pole per phase, the number of slots is increased, increasing the number of extended portions 30a in the coil ends 16a and 16b proportionately, and because the surface area of the coil ends 16a and 16b contacting the outside air is increased, cooling of the coil ends 16a and 16b is improved and temperature increases in the stator winding 16 are suppressed, further contributing to improved output.

Embodiment 2

Figure 19A:
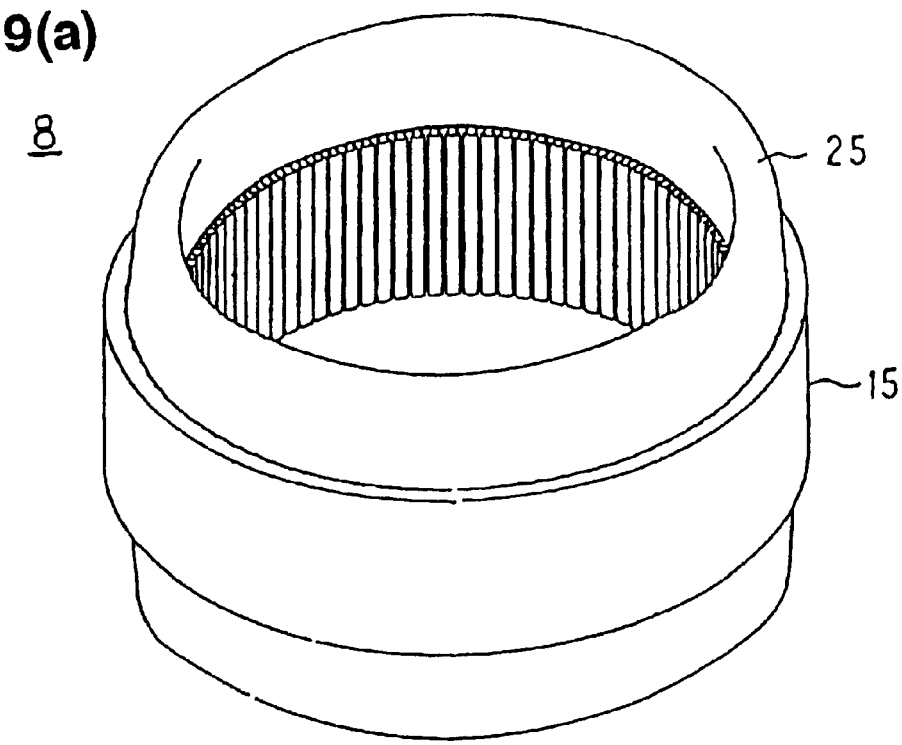
FIG. 19(a) is a perspective of a stator according to Embodiment 2 of the present invention.

FIG. 19(a) is a perspective of a stator 8 of an automotive alternator according to Embodiment 2 of the present invention. The coil ends 16a and 16b of the stator 8 are integrally molded in a resin 25 having high thermal conductivity. The resin 25 is a mixture of epoxy resin (principal component) having a thermal conductivity of 0.5 (W/mk) and alumina having a thermal conductivity of 3.5 (W/mk) in a ratio of one to four (1:4). Moreover, the output wires and neutral-point lead wires of each phase have been omitted from the drawing.

In this embodiment, because the surfaces of the coil ends 16a and 16b are made smooth by the resin 25, cooling ventilation flows smoothly around inside the rotor 7 without interference from the coil ends 16a and 16b, improving the cooling of the rotor 7. Furthermore, because the temperature distribution in the coil ends 16a and 16b is made uniform, temperature increases in the stator winding 16 can be suppressed.

Figure 19B:
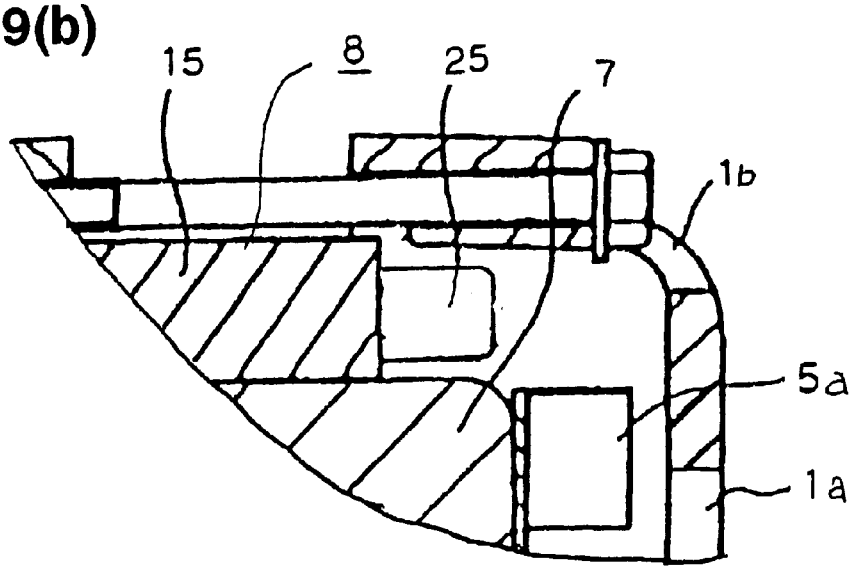
FIG. 19(b) is a partial cross section of an automotive alternator according to Embodiment 2 of the present invention.
Figure 20:
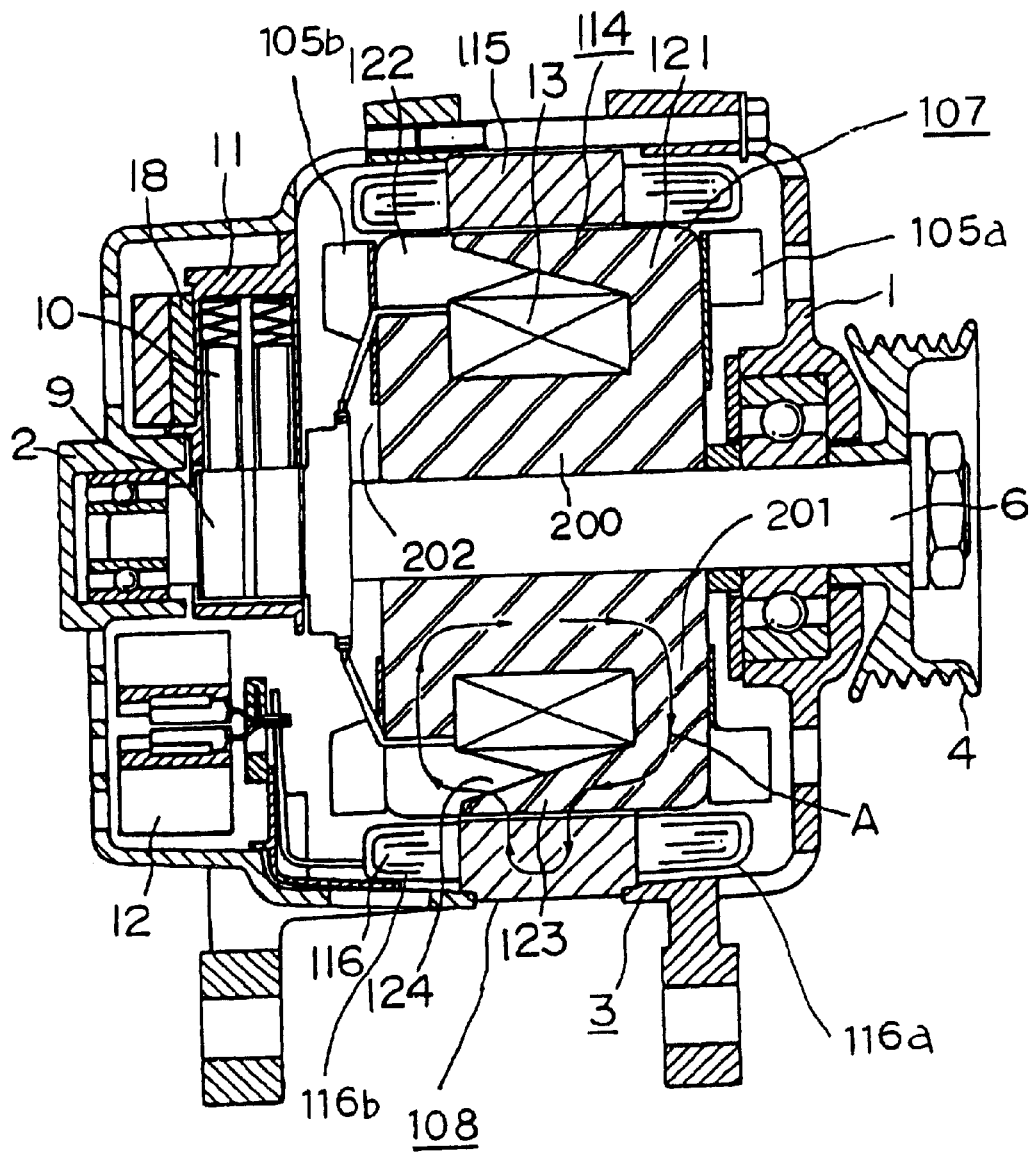
FIG. 20 is a cross section of a conventional automotive alternator.
Figure 21:
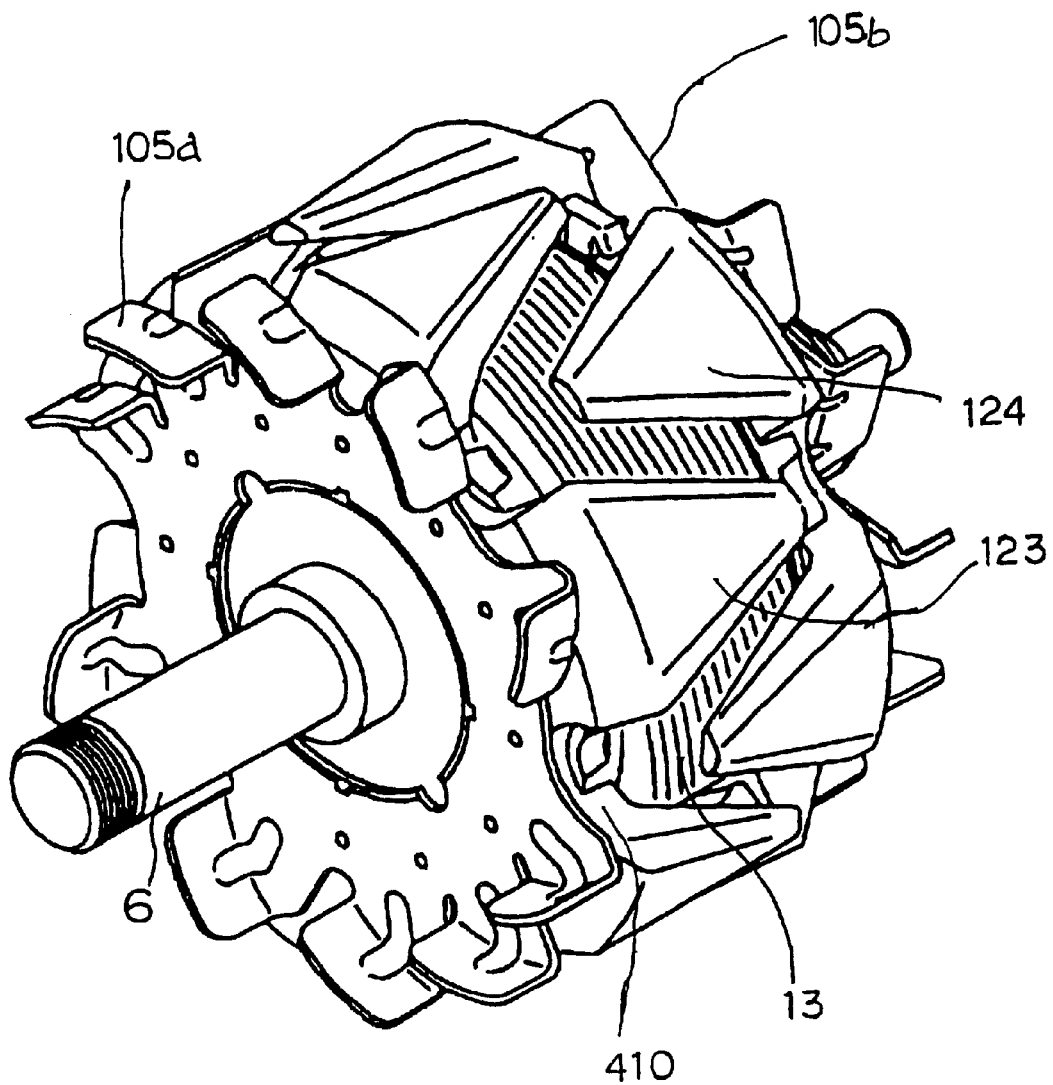
FIG. 21 is a perspective of a rotor in FIG. 20.
Figure 22:
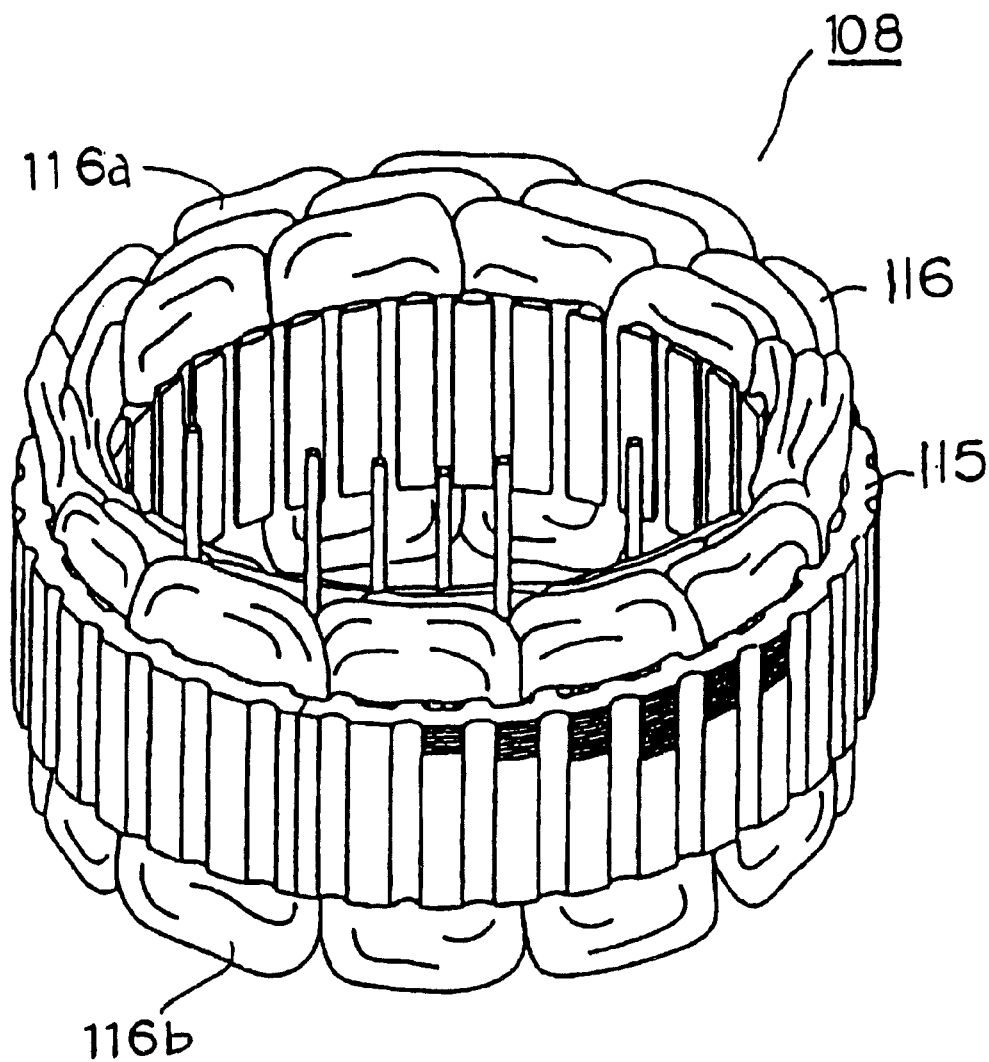
FIG. 22 is a perspective of a stator in FIG. 20.
Figure 23:
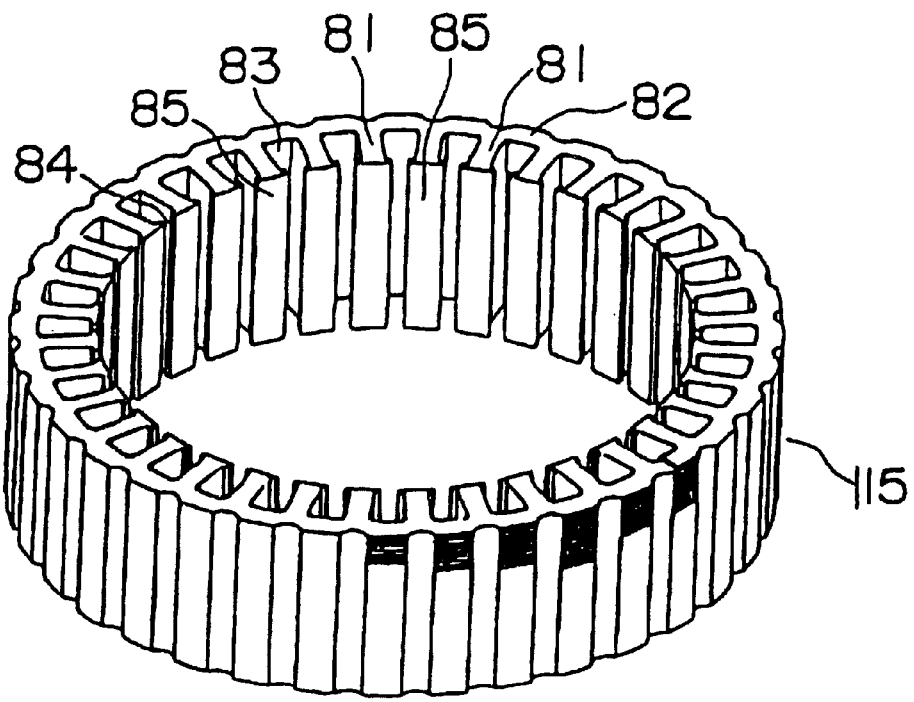
FIG. 23 is perspective of a stator core in FIG. 22.
Figure 24:
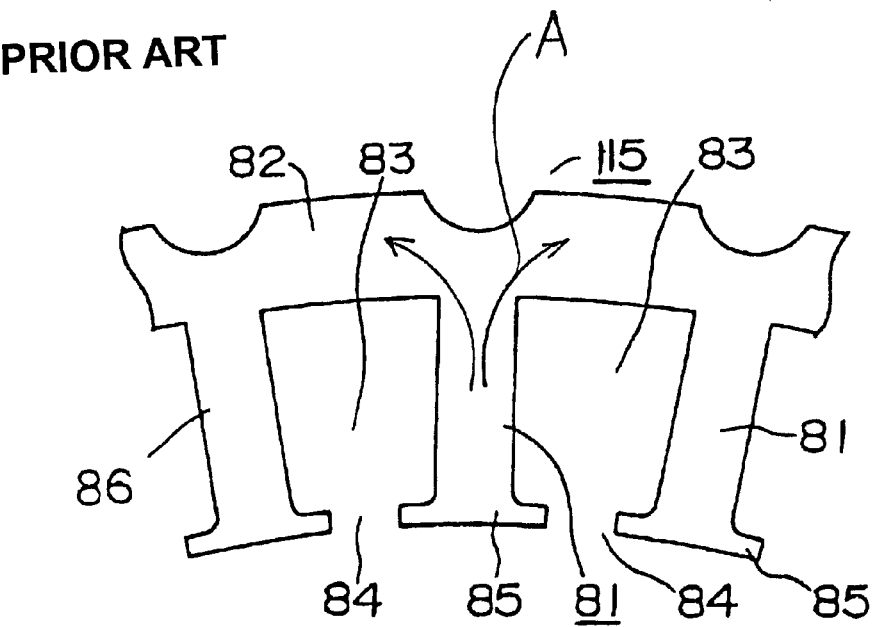
FIG. 24 is partial end elevation of the stator core in FIG. 22.
Figure 25:
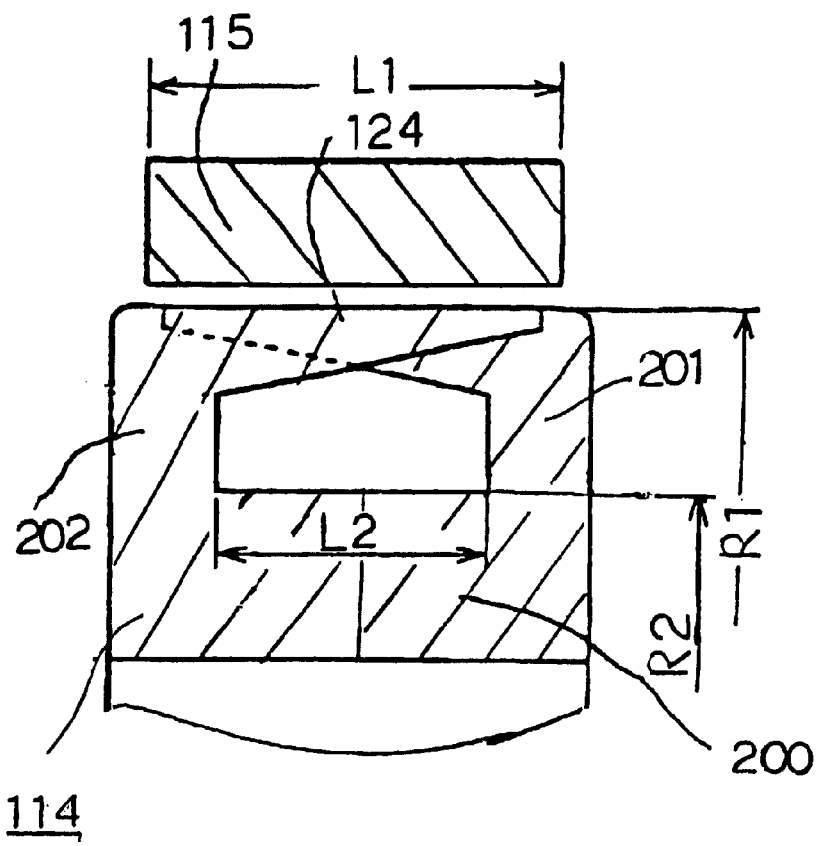
FIG. 25 is a diagram explaining the positional relationship between the stator core and a pole core in the conventional automotive alternator.

As shown in FIG. 19(b), because an overall axial length of the stator 8 is smaller than an overall axial length of the pole cores of the rotor 7, cooling ventilation flowing centrifugally from the first fan 5a and the second fan 5b flows smoothly without colliding directly with the resin 25 covering the coil ends 16a and 16b, improving the cooling of the stator 8 and the rotor 7.

Moreover, in the stator winding 16 of the above embodiments, conductors 30 are wound continuously so as to alternately occupy an inner layer and an outer layer in a slot depth direction within slots a predetermined number of slots apart, and the extended portions 30a in the coil ends 16a and 16b are separated circumferentially and radially from each other, and arranged neatly in two rows, but naturally the present invention is not limited to this configuration. For example, extended portions which are stacked in two layers axially may also be arranged circumferentially.

The above embodiments were explained for a three-phase winding 16 in which there were four turns of conductors 30, but when high output is required at even lower speeds, the number of turns of conductors may be made six turns or eight turns, for example, or the extended portions of the coil ends may be arranged in three rows or four rows circumferentially.

In each of the above embodiments, the number of slots in the stator was ninety-six slots for sixteen magnetic poles, but three phases and seventy-two slots for twelve magnetic poles, 120 slots for twenty poles, etc., may also be adopted.

As explained above, an alternator according to one aspect of the present invention comprises:
a rotor for forming north-seeking (N) and south-seeking (S) poles alternately about a rotational circumference; and a stator surrounding the rotor, the rotor including:

a rotor coil for generating magnetic flux on passage of electric current; and a pole core comprising:
a cylindrical portion onto which the rotor coil is wound;
disk portions extending radially from both axial end portions of the cylindrical portion; and
a number of claw-shaped magnetic poles extending axially from the disk portions and covering the rotor coil, the claw-shaped magnetic poles being magnetized with the north-seeking (N) and south-seeking (S) poles by the magnetic flux, and the stator including:

a stator core provided with a number of slots formed so as to extend axially and to be spaced circumferentially; and a stator winding installed in the stator core, a ratio (L2/L1) between an axial length L1 of the disk portions and a length L2 of the stator core overlapping the disk portions in a radial direction being 0.3 or more, and a ratio (R2/R1) between an outside radius R1 of the claw-shaped magnetic poles and an outside radius R2 of the cylindrical portion being within a range of 0.50 to 0.54.

Therefore, in addition to the magnetic flux which flows from the claw-shaped magnetic poles, magnetic flux also flows directly from the disk portions to the stator core, increasing the cross-sectional area of the magnetic path and increasing the amount of magnetic flux, and copper loss in the rotor coil is also reduced, improving output.

According to one form of the alternator, a first fan and a second fan having different shapes from each other may be mounted to the disk portions of the rotor such that cooling ventilation flows between the rotor and the stator due to a difference in air pressure arising due to rotation of the first fan and the second fan.

Therefore, the rotor coil is actively cooled, enabling the suppression of reductions in the field current due to copper loss.

According to another form of the alternator, a first fan and a second fan having substantially the same shape as each other may be mounted to the disk portions of the rotor such that cooling ventilation flows between the rotor and the stator due to a difference in air pressure arising due to a difference in wind resistance on respective intake sides of the first fan and the second fan.

Therefore, the rotor coil is actively cooled, enabling the suppression of reductions in the field current due to copper loss.

According to still another form of the alternator, a resin having high thermal conductivity may be disposed in at least one position selected from:
an outer circumferential surface of the rotor coil; and
a space between the rotor coil and the disk portions.

Therefore, cooling of the rotor coil is improved by the thermal conductivity of the resin, enabling the suppression of reductions in the field current due to copper loss.

According to still another form of the alternator, the stator winding may be provided with a number of stator winding portions in which conductors are wound continuously so as to alternately occupy an inner layer and an outer layer in a slot depth direction within the slots at intervals of a predetermined number of slots, the conductors folding back outside the slots at axial end surfaces of the stator core to form coil ends which are composed of extended portions lined up circumferentially.

Therefore, neatness in the coil ends becomes possible, improving the cooling of the rotor without hindering the flow of cooling ventilation inside the rotor. Furthermore, cooling of the coil ends is improved, enabling the suppression of high increases in the stator winding.

According to still another form of the alternator, a resin having high thermal conductivity may be disposed in the coil ends.

Therefore, cooling of the coil ends is improved, enabling the suppression of high increases in the stator winding.

According to still another form of the alternator, an overall axial length of the stator may be less than an overall axial length of said pole core of the rotor.

Therefore, ventilation from the fans flows smoothly without being hindered by the coil ends, for example, improving the cooling of the stator and the rotor.

What is claimed is:

1. An alternator comprising:
   a rotor forming north-seeking (N) and south-seeking (S) poles alternately about a rotational circumference; and
   a stator surrounding said rotor,
   said rotor including:
   a rotor coil for generating magnetic flux on passage of electric current; and
   a pole core comprising:
     a cylindrical portion onto which said rotor coil is wound;
     disk portions extending radially from both axial end portions of said cylindrical portion; and
     a number of claw-shaped magnetic poles extending axially from said disk portions and covering said rotor coil, said claw-shaped magnetic poles being magnetized with said north-seeking (N) and south-seeking (S) poles by said magnetic flux, and
   said stator including:
   a stator core provided with a number of slots formed so as to extend axially and to be spaced circumferentially; and
   a stator winding installed in said stator core,
   a ratio (L2/L1) between axial length L1 of said disk portions and a length L2 of a portion of said stator core axially overlapping said disk portions in a radial direction being 0.3 or more, and
   a ratio (R2/R1) between an outside radius R1 of said claw-shaped magnetic poles and an outside radius R2 of said cylindrical portion being within a range of 0.50 to 0.54.

2. The alternator according to claim 1 wherein a first fan and a second fan having different shapes from each other are mounted to said disk portions of said rotor such that cooling ventilation flows between said rotor and said stator due to a difference in air pressure arising due to rotation of said first fan and said second fan.

3. The alternator according to claim 1 wherein a first fan and a second fan having substantially the same shape as each other are mounted to said disk portions of said rotor such that cooling ventilation flows between said rotor and said stator due to a difference in air pressure arising due to a difference in wind resistance on respective intake sides of said first fan and said second fan.

4. The alternator according to claim 1 wherein a resin having high thermal conductivity is disposed in at least one position selected from:
   an outer circumferential surface of said rotor coil; and
   a space between said rotor coil and said disk portions.

5. The alternator according to claim 1 wherein an overall axial length of said stator is less than an overall axial length of said pole core of said rotor.

6. The alternator according to claim 1 wherein said stator winding is provided with a number of stator winding portions in which conductors are wound continuously so as to alternately occupy an inner layer and an outer layer in a slot depth direction within said slots at intervals of a predetermined number of slots, said conductors folding back outside said slots at axial end surfaces of said stator core to form coil ends which are composed of extended portions lined up circumferentially.

7. The alternator according to claim 6 wherein a resin having high thermal conductivity is disposed in said coil ends.

* * * * *